(12) United States Patent
Frederick, Jr. et al.

(10) Patent No.: US 9,892,220 B2
(45) Date of Patent: Feb. 13, 2018

(54) METHOD AND APPARATUS FOR ADJUSTING A TIMING DERATE FOR STATIC TIMING ANALYSIS

(71) Applicant: ARM Limited, Cambridge (GB)

(72) Inventors: Marlin Wayne Frederick, Jr., Austin, TX (US); Karen Lee Delk, Austin, TX (US); Lena Ahlen, Austin, TX (US); James Dennis Dodrill, Austin, TX (US)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/456,634

(22) Filed: Mar. 13, 2017

(65) Prior Publication Data

US 2017/0185709 A1  Jun. 29, 2017

Related U.S. Application Data (63) Continuation of application No. 15/239,991, filed on Aug. 18, 2016, now Pat. No. 9,690,889, which is a continuation-in-part of application No. 14/307,646, filed on Jun. 18, 2014, now abandoned.

(51) Int. Cl.
*G06F 9/455* (2006.01)
*G06F 17/50* (2006.01)

(52) U.S. Cl.
CPC ...... *G06F 17/5031* (2013.01); *G06F 17/5081* (2013.01); *G06F 2217/84* (2013.01)

(58) Field of Classification Search
USPC ................. 716/106, 108, 113, 134
See application file for complete search history.

(56) References Cited

U.S. PATENT DOCUMENTS

| | | | | |
|---|---|---|---|---|
| 6,047,346 | A * | 4/2000 | Lau ..................... | G06F 13/4072 327/158 |
| 6,150,862 | A * | 11/2000 | Vikinski ............... | H03K 5/133 327/262 |
| 8,656,331 | B1 * | 2/2014 | Sundareswaran ... | G06F 17/5036 716/113 |
| 9,245,071 | B2 | 1/2016 | Katz et al. | |
| | | | (Continued) | |

OTHER PUBLICATIONS

U.S. Appl. No. 15/239,991, filed Aug. 18, 2016; Inventor: Frederick, Jr. et al.

(Continued)

*Primary Examiner* — Brian Ngo
(74) *Attorney, Agent, or Firm* — Nixon & Vanderhye P.C.

(57) ABSTRACT

A static timing analysis method and apparatus that determine an expected design condition surrounding a target cell in an integrated circuit design. A derate adjustment is determined based on the expected design condition for a target cell and a timing derate, representing variation in propagation delay for a default design condition, is then adjusted based on the derate adjustment. An expected timing of a signal path including the target cell is determined based on the adjusted timing derate. The derate adjustment may be determined based on simulated variance of the propagation delay through the target cell for the expected design condition. This approach avoids unnecessary optimism or pessimism in the timing derate, which reduces the number of false positive or false negative detections of timing violations in the static timing analysis.

19 Claims, 5 Drawing Sheets

(56) References Cited

U.S. PATENT DOCUMENTS

| | | | |
|---|---|---|---|
| 2010/0050139 A1* | 2/2010 | Abadir | G06F 17/5045 716/106 |
| 2010/0318951 A1* | 12/2010 | Foreman | G06F 17/5031 716/108 |
| 2013/0152034 A1* | 6/2013 | Tetelbaum | G06F 17/5045 716/113 |
| 2013/0227510 A1* | 8/2013 | Katz | G06F 17/5031 716/113 |
| 2013/0239079 A1* | 9/2013 | Tetelbaum | G06F 17/5031 716/113 |
| 2014/0082576 A1* | 3/2014 | Shaikh | G06F 17/5031 716/113 |
| 2015/0370955 A1 | 12/2015 | Ahlen et al. | |

OTHER PUBLICATIONS

U.S. Appl. No. 14/307,646, filed Jun. 18, 2014; Inventor: Ahlen et al.

Office Action dated Apr. 21, 2016 in co-pending U.S. Appl. No. 14/307,646 14 pages.

Final Office Action dated Aug. 19, 2016 in co-pending U.S. Appl. No. 14/307,646 13 pages.

Office Action dated Nov. 1, 2016 in co-pending U.S. Appl. No. 15/239,991, 17 pages.

\* cited by examiner

|  | Index 1 - Slew → |  |  |  |  |  |
|---|---|---|---|---|---|---|
| Index 2 - Load ↓ | Index 1 - 1<br>Index 2 - 1 | Index 1 - 2<br>Index 2 - 1 | Index 1 - 3<br>Index 2 - 1 | Index 1 - 4<br>Index 2 - 1 | Index 1 - 5<br>Index 2 - 1 | Index 1 - 6<br>Index 2 - 1 |
|  | Index 1 - 1<br>Index 2 - 2 | Index 1 - 2<br>Index 2 - 2 | Index 1 - 3<br>Index 2 - 2 | Index 1 - 4<br>Index 2 - 2 | Index 1 - 5<br>Index 2 - 2 | Index 1 - 6<br>Index 2 - 2 |
|  | Index 1 - 1<br>Index 2 - 3 | Index 1 - 2<br>Index 2 - 3 | Index 1 - 3<br>Index 2 - 3 | Index 1 - 4<br>Index 2 - 3 | Index 1 - 5<br>Index 2 - 3 | Index 1 - 6<br>Index 2 - 3 |
|  | Index 1 - 1<br>Index 2 - 4 | Index 1 - 2<br>Index 2 - 4 | Index 1 - 3<br>Index 2 - 4 | Index 1 - 4<br>Index 2 - 4 | Index 1 - 5<br>Index 2 - 4 | Index 1 - 6<br>Index 2 - 4 |
|  | Index 1 - 1<br>Index 2 - 5 | Index 1 - 2<br>Index 2 - 5 | Index 1 - 3<br>Index 2 - 5 | Index 1 - 4<br>Index 2 - 5 | Index 1 - 5<br>Index 2 - 5 | Index 1 - 6<br>Index 2 - 5 |
|  | Index 1 - 1<br>Index 2 - 6 | Index 1 - 2<br>Index 2 - 6 | Index 1 - 3<br>Index 2 - 6 | Index 1 - 4<br>Index 2 - 6 | Index 1 - 5<br>Index 2 - 6 | Index 1 - 6<br>Index 2 - 6 |

80 (AOCV default)

FIG. 7

$$82 \quad \text{Index1-1, Index2-1} = \frac{1 \pm \frac{n * \sigma_{1\_1\_delay}}{\mu_{1\_1\_delay}}}{1 \pm \frac{n * \sigma_{4\_4\_delay}}{\mu_{4\_4\_delay}}}$$

$$84 \quad \text{Index1-6, Index2-1} = \frac{1 \pm \frac{n * \sigma_{6\_1\_delay}}{\mu_{6\_1\_delay}}}{1 \pm \frac{n * \sigma_{4\_4\_delay}}{\mu_{4\_4\_delay}}}$$

$$86 \quad \text{Index1-6, Index2-6} = \frac{1 \pm \frac{n * \sigma_{6\_6\_delay}}{\mu_{6\_6\_delay}}}{1 \pm \frac{n * \sigma_{4\_4\_delay}}{\mu_{4\_4\_delay}}}$$

FIG. 8

METHOD AND APPARATUS FOR ADJUSTING A TIMING DERATE FOR STATIC TIMING ANALYSIS

This application is a continuation of U.S. patent application Ser. No. 15/239,991, filed on Aug. 18, 2016, which is a continuation-in-part of U.S. patent application Ser. No. 14/307,646, filed on Jun. 18, 2014, the contents of each of which are entirely incorporated herein by reference.

BACKGROUND

The present technique relates to the field of integrated circuits. More particularly, the technique relates to static timing analysis.

Static timing analysis (STA) is a method for determining expected timings of signal paths in an integrated circuit design. This is useful for checking whether the integrated circuit will operate correctly when manufactured. Typically, STA uses a representation of the integrated circuit design that identifies various logic cells of the circuit and specifies how they are connected together. Based on the properties of each logic cell, the delay through timing paths of the circuit can be estimated to determine whether the design would cause any timing violations which could lead to incorrect behaviour. If necessary, the integrated circuit design can then be modified to eliminate the timing violations which were detected.

In practice, the actual propagation delay through a logic cell may vary from chip to chip, between different areas of a chip, or with time, for example due to process, voltage and temperature variations. Therefore, a single value for the expected delay through a cell may not be enough, and so the static timing analysis may use a timing derate to characterise the variation in the delay through the cell. The timing derate allows the STA tool to estimate likely minimum or maximum delays and hence determine whether an integrated circuit design is likely to meet its timing requirements across a range of corner conditions. The present technique seeks to provide an improved method of using timing derates.

SUMMARY

Viewed from one aspect, the present technique provides a computer-implemented static timing analysis method for determining an expected timing of a signal path of an integrated circuit design, the method comprising:

determining a timing derate for a target cell on the signal path, wherein the timing derate is read from a derate table, the timing derate representing variation in a propagation delay through the target cell for a default design condition surrounding the target cell;

determining an expected design condition surrounding the target cell in the integrated circuit design;

determining a derate adjustment factor based on the expected design condition of the target cell;

adjusting the timing derate read from the derate table using the derate adjustment factor to generate an adjusted timing derate; and determining the expected timing of the signal path based on the adjusted timing derate for the target cell.

Existing static timing analysis tools typically determine a timing derate for a given logic cell at a single default design condition, which is applied for all cells regardless of their actual design condition. However, in practice the variation in delay through the cell depends on the actual design condition of the cell, which may depend on what circuitry surrounds the cell in the integrated circuit design. For example, the amount of capacitive load coupled to a cell, the slew rate of an input signal for the cell, or local voltage changes, such as IR drop, applied to the target cell may all affect the actual delay, and cell-to-cell variation with respect to design parameters such as load, slew or voltage variation is not considered with current timing derate values. Therefore, the actual derate value used in existing STA tools will in some cases be too optimistic (so that potential timing errors may not be detected) and in other cases too pessimistic (so that timing errors may be detected which would not actually occur in practice). Optimism can be dangerous because it may lead the STA tool to determine that a circuit design meets its timing requirements, when in fact when it is manufactured it fails, reducing the yield percentage of manufactured circuits which operate correctly. On the other hand, providing a margin for pessimism may ensure that the eventual design behaves correctly, but this is at the cost of extra work in fixing timing paths when the STA method determines that a circuit has failed its timing requirements even if this would not actually be the case in practice. Pessimism also incurs a cost of inserting extra buffers into the circuit to make the circuit meet its timing requirements which might not actually have been required to produce a correctly functioning circuit. Such buffers result in increased power consumption and circuit area, which is undesirable.

To address these problems, the present technique determines an expected design condition surrounding a target cell in the integrated circuit design. A derate adjustment factor is determined based on the expected design condition and then the timing derate representing variation in the propagation delay for the default design condition is adjusted based on the derate adjustment factor for the expected design condition. The adjusted timing derate can then be used to determine the expected timing signal path. In this way, the adjusted derate will more accurately track the actual variation in delay, so that both optimism and pessimism in the delay through the target cell can be reduced. This reduces the likelihood of failures in the integrated circuit design, without unnecessarily introducing extra buffers to fix timing paths.

The logic cells modelled in the static timing analysis may be any functional element of a circuit. For example, the logic cells may be logic gates, flip-flops or latches or other storage elements, buffers or inverters, or other combinational circuitry. The STA method may investigate signal propagation delays along both data paths and clock paths to check whether the relative timings of the data signal and clock signal are appropriate. Hence, the target cell for which the derate adjustment is determined may be on a clock path or a data path.

The derate adjustment can be repeated for a number of logic cells of the integrated circuit design to estimate the actual expected variation in propagation delay through each cell in the expected design condition for that cell. The expected timing for a signal path may then be determined based on the adjusted timing derate for each cell within the path.

In some cases the timing derate may be represented by expected maximum or minimum values for the propagation delay through the cell. In other cases the timing derates may be represented by a variance or standard deviation of the propagation delay and/or a mean value of the propagation delay. The variation in propagation delay may depend on process variation, which is a random process which can be characterised by a sigma variation or variance. Hence, the present technique may be used with statistical timing analysis methods.

The expected design condition and default design condition may be dependent on at least one design parameter of the target cell. The design parameter may be any parameter which affects the delay through target cell, which depends on the surroundings of the target cell within the particular circuit design. That is, the design parameter may be a systematic condition resulting from other circuitry surrounding the cell, as opposed to a randomly occurring variation such as temperature or process variation (the unadjusted timing derate read from the derate table may already characterise random variation caused by process variation so that it is not necessary to consider this when determining the derate adjustment). For example, the design parameter may comprise any one or more of: a capacitive load of the target cell, a slew rate of an input signal for the target cell; and a voltage level applied to the target cell. A given implementation may only select some of these to consider in the derate adjustment. For example, in one embodiment the derate adjustment may be determined according to the load and slew but may not consider voltage. In general, the expected design condition may be any condition in which at least one of these one or more design parameters is different to the default design condition (it is not necessary for all of the parameters to be different). For example, even if a cell is experiences the same load as the cell used to determine the timing derate for the default design condition, if there is a different slew rate then this may still produce a different variation in the propagation delay, which can be reflected by adjusting the timing derate.

The timing derate for the default design condition may be determined using any known technique. For example, in systems which use the "on chip variation" (OCV) technique, a single value for the timing derate may be determined for a given type of target cell regardless of the relative position of the cell within the circuit. The OCV derate can then be adjusted based on the design conditions of the cell using the derate adjustment selected based on the expected design condition.

Alternatively, the timing derate may vary according to the relative position of the target cell within the integrated circuit design. For example, advanced on chip variation (AOCV) may be used. With AOCV, the timing derate may be determined according to at least one of a logic depth of the target cell (dependent on the number of other cells that are connected between the target cell and a reference point of the circuit) and a physical distance between a target cell and a reference point of the circuit. In general, as logic depth increases (i.e. the signal has to cross a greater number of other cells before reaching the target cell), the amount of variation of the propagation delay decreases since it becomes more and more unlikely that all the logic cells along the path will simultaneously experience the best case or worst case conditions and in practice it is more likely that some will have a faster propagation delay while others will be slower so that the variation from each cell tends to cancel each other out to some extent. On the other hand, the variation in propagation delay typically increases with distance of the target cell away from the reference point. The reference point may be a point in the circuit with respect to which the signal path delays are measured (e.g. a point at which the clock path splits, so that the skew between different clock paths relative to the split point can be measured).

Hence, a derate table may be maintained, for example an AOCV table according to the AOCV technique, and may be indexed based on the relative position of the target cell within the integrated circuit design. In particular, the derate table may be a stage-based OCV table (also known as "AOCV with depth") which is indexed based on the logic depth. The default timing derate may be read from the derate table. However, since the AOCV derate is independent of load, slew, voltage fluctuations or other design parameters of the target cell, the AOCV values are typically optimistic or pessimistic depending on whether the actual design conditions of the target cell are more or less favourable than the default condition for which the AOCV table was measured. By adjusting the AOCV derate using the derate adjustment selected based on the expected design condition, this optimism or pessimism can be reduced to improve the prediction of timing violations.

The expected design condition for the target cell may be determined in different ways. In some cases the integrated circuit may be simulated to determine what conditions are experienced by each target cell. Typically the STA tool may not have the ability to perform simulation and so a separate simulation such as SPICE may be used. On the other hand, in some cases the user may wish to probe whether the circuit will meet its timing requirements at specific design conditions, and so may specify the expected design conditions for the target cell, without performing a simulation. Alternatively, an earlier simulation may already have identified the expected design conditions and so the user may input these. In some cases the expected design condition for the target cell may be stored on a recording medium which is read by the STA tool.

A data structure may be maintained by the STA tool which stores derate adjustments for a range of different expected design conditions. For example, the data structure may be a table. Alternatively, the data structure may be part of the software code for the STA tool which determines the expected design condition for a cell and then maps one or more design parameters defining the expected design condition to corresponding derate adjustments (for example a series of if-then statements may be used to set the derate adjustment, or an array or other software structure may be looked up). When the derate adjustments account for two or more design parameters of the cell (slew and load) then the derate adjustments may be indexed by each of these design parameters.

The data structure may not store derate adjustments for all possible design conditions, as this may require a very large table. Instead, the data structure may store derate adjustments for selected design conditions, and when the expected design condition for a target cell falls between design conditions represented in the table, interpolation can be used to determine the derate adjustment factor for the expected design condition.

In some cases, different derate adjustment data structures (e.g. tables) may be maintained for different types of cell, and/or for different process corners. Hence, the appropriate table for the cell instance being considered may be selected, and then the derate adjustment factor determined from the selected table.

In general the derate adjustment for a given expected design condition may be predetermined based on a simulated variance of the propagation delay through the target cell at the expected design condition. Hence the derate adjustment uses a sigma (normal) distribution of various parameter inputs from a standard cell (e.g. load and slew) to see how the delay of standard cells behaves with these parameters, so that an additional derate factor can be found based on the selected parameters.

In some cases, the derate adjustments may be determined for a single type of target cell and it may be assumed that all logic cells may have similar derate adjustments. For example a single default cell such as an inverter or another basic logic cell may be used to determine the derate adjustment. Even if the actual variation through different cells differs slightly, a single derate adjustment may still give good results with reduced processing complexity.

However, to improve prediction accuracy even further and eliminate further optimism or pessimism, different derate adjustments may be set for different cell types and then the appropriate derate adjustment can be read out based on the type of target cell.

In one example, the derate adjustment factor may indicate a ratio of a variance of the propagation delay through the target cell at said expected design condition to a variance of the propagation delay through the target cell at said default design condition. The adjusted timing derate $D_F$ may be determined according to $D_F=(1-\alpha)+\alpha D_i$, where $D_i$ is the timing derate read from the derate table, and $\alpha$ is the derate adjustment factor.

In another example, the adjusted timing derate $D_F$ may be determined according to $D_F=kD_i$, where $D_i$ is the timing derate read from the derate table, $$k = \frac{(1-\alpha)+\alpha D_g}{D_g},$$

$\alpha$ is the derate adjustment factor, and $D_g$ is a graph-based timing derate for the target cell.

Alternatively, the derate adjustment may be a multiplying factor for multiplying with the timing derate to generate the adjusted derate.

In some cases the derate adjustment may increase the variance of the propagation delay while in other cases the variance may be decreased. Hence, the derate adjustment factor may be greater, equal to, or less than one. This will depend on whether the design condition for which the derate adjustment is determined is more or less favourable than the default design condition assumed for the original time derate (such as a derate read from the AOCV table).

In some examples, for at least one expected design condition other than the default design condition, the adjusted timing derate equals the timing derate read from the derate table. For some design conditions, the original derate stored in the AOCV table may be good enough to model variation in propagation delay for cells experiencing such conditions. For example, as much as 70% of the slew/load-space may be adequately modelled by the AOCV table (70% is just an example, and in some examples the percentage of the slew/load-space that is adequately modelled by the AOCV table may be greater or smaller than 70%). Hence, the derate adjustment may only be needed for selected design conditions for which the derate values in the AOCV table are too optimistic or pessimistic. Hence, for some design conditions the adjusted timing derate may be equal to the timing derate read from the derate table. This could be implemented in different ways. In some cases, the derate adjustment value could be 1 for some design conditions, so that applying the derate adjustment to the derate read from the derate table results in no change.

However, in many cases it may be more efficient to provide an additional step of checking whether the expected design condition is outside a predetermined set of design conditions for which an adjustment is required, and when the expected design condition is outside the predetermined set, determine the derate adjustment factor and adjust the timing derate. When the expected design condition is outside the predetermined set of design conditions for which an adjustment is required, the derate adjustment can be applied to provide more accurate tracking of the actual variation in delay. When the expected design condition is within the predetermined set of design conditions, the original timing derate can be read from the derate table and used for the timing analysis without determining a derate adjustment factor. This allows a smaller derate adjustment data structure to be used, as it is not necessary to provide redundant entries for design conditions where the derate adjustment factor equals 1.

Having estimated the expected timing of at least one signal path in the integrated circuit design, it can then be determined whether any timing violations are likely to occur. By adjusting the timing derate in the way described above, the number of false positive or false negative timing violation detections can be reduced. The data representation of the integrated circuit design can be updated to modify the integrated circuit design when a timing violation is detected.

Viewed from another aspect, the present technique provides a computer apparatus configured to perform static timing analysis for determining an expected timing of a signal path of an integrated circuit design;

the computer apparatus comprising processing circuitry configured to:

determine a timing derate for a target cell on the signal path by reading the timing derate from a derate table, the timing derate representing variation in a propagation delay through the target cell for a default design condition surrounding the target cell;

determine an expected design condition surrounding the target cell in the integrated circuit design;

determine a derate adjustment factor based on the expected design condition of the target cell;

adjust the timing derate using the derate adjustment factor to generate an adjusted timing derate; and determine the expected timing of the signal path based on the adjusted timing derate for the target cell.

Viewed from a further aspect, the present technique provides a computer apparatus for performing static timing analysis for determining an expected timing of a signal path of an integrated circuit design;

the apparatus comprising processing means for:

determining a timing derate for a target cell on the signal path by reading the timing derate from a derate table, the timing derate representing variation in a propagation delay through the target cell for a default design condition surrounding the target cell;

determining an expected design condition surrounding the target cell in the integrated circuit design;

determining a derate adjustment factor based on the expected design condition of the target cell;

adjusting the timing derate using the derate adjustment factor to generate an adjusted timing derate; and determining the expected timing of the signal path based on the adjusted timing derate for the target cell.

Further aspects, features and advantages of the present technique will be apparent from the following description of examples, which is to be read in conjunction with the accompanying drawings.

DESCRIPTION OF EXAMPLE EMBODIMENTS

Figure 1:
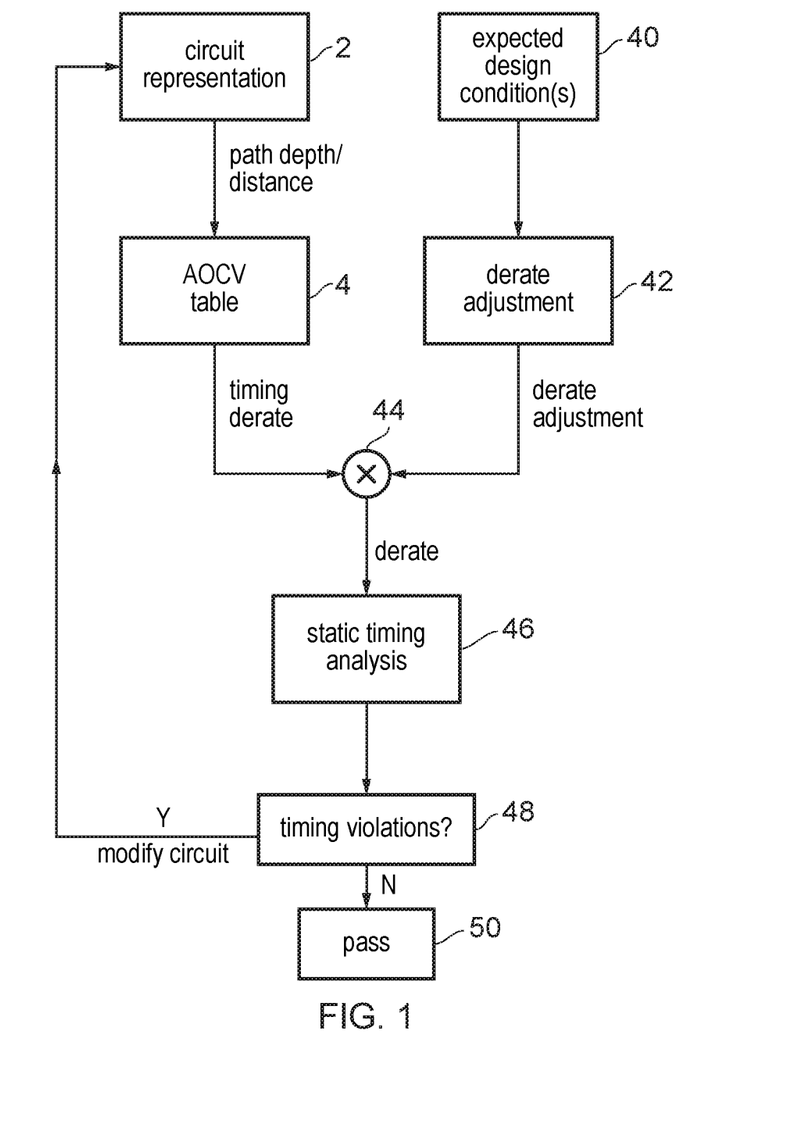
FIG. 1 illustrates an example of a static timing method.

FIG. 1 shows a method of performing static timing analysis (STA) for determining whether an integrated circuit design meets functional timing requirements. A circuit representation 2 is input to define the integrated circuit design. The input circuit representation may be generated by an automated design tool using a standard cell library, for example. For example the circuit representation may comprise a netlist identifying the logic cells which form part of the circuit and their interconnections, as well as library data defining characteristics of the cells such as their timing behaviour, physical characteristics, power consumption, etc.

For each cell in the net list, a timing derate is looked up in a derate table 4, which is an AOCV (Advanced On-Chip Variation) table in this example. The timing derate is used to characterise expected variation in the propagation delay through the cell. For example, the derate may identify a variance, standard deviation or other value representing the expected variation in the expected delay, or may indicate maximum or minimum values for the delay. By providing an indication of the expected spread of likely delay values (which may be caused by process, voltage or temperature variations for example), corner cases can be tested by the STA tool to make sure that the circuit is likely to function correctly across a range of corner conditions. The AOCV table 4 stores a number of different timing derate values which are indexed based on the relative position of the target cell in the integrated circuit design (more specifically, based on logic depth and distance). This reflects the fact the same type of logic cell may experience different amounts of variation in the propagation delay when located at different positions within the circuit.

Figure 2:
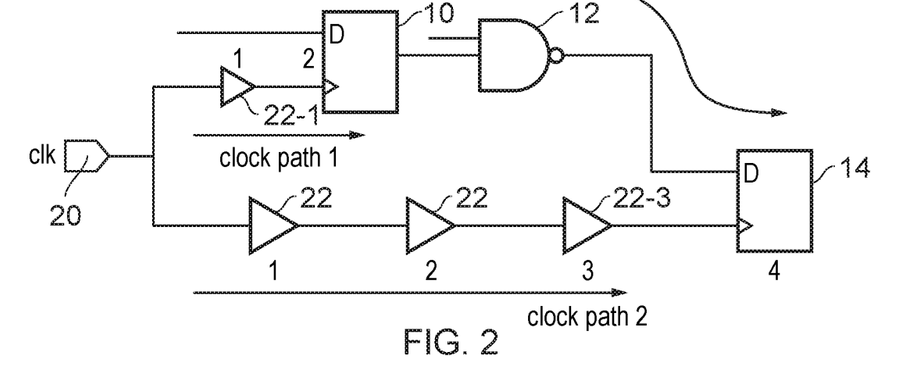
FIG. 2 shows an example representation of a portion of an integrated circuit design illustrating clock paths of different logic depth.

For example, FIG. 2 shows a schematic example of a circuit layout including a number of logic cells. It will be appreciated that most real circuits are more complex than this example. The circuit includes a data path comprising a first flip flop 10, a NAND gate 12 and a second flip flop 14. A data signal is captured in the first flip flop 10, and then NANDed with another value by NAND gate 12 before the NAND result is captured by the second flip flop 14. The first and second flip flops 10, 14 are clocked by a clock signal which is derived from a clock node 20. The clock signal for the first flip flop 10 traverses one buffer 22 along a first clock path before reaching the flip flop 10, while the clock signal for the second flip flop 14 traverses three buffers 22 before reaching the flip flop along a second clock path. Hence, the two clock paths have different logic depths. Even if all the buffers 22 are of the same type, the third buffer 22-3 on the second clock path will experience a different variation in propagation delay compared to the first buffer 22-1 on the first clock path or the earlier buffers on the second clock path. This is because although each individual buffer may have a delay which may vary between a minimum value and a maximum value, as the logic depth of a given signal path increases, it becomes increasingly unlikely that all of the preceding logic cells will simultaneously experience the worst case delay or best case delay. In general, the variation of propagation delay along a longer path will be reduced because the variation in delay of each cell will tend to cancel each other out to some extent. Therefore, in AOCV the table 4 may be indexed based on the logic depth of a given cell within a signal path and provide a timing derate indicating a smaller amount of variation for a cell at a longer logic depth than a cell at a shorter logic depth (for example, if the timing derate indicates the variance, the variance may be smaller, while if the timing derate indicates minimum/maximum values, these may be adjusted to be closer to the mean value of the delay). While FIG. 2 shows examples where clock paths have different logic depths, similarly different data paths may have different logic depths and be provided with different derates by the AOCV table 4.

Figure 3:
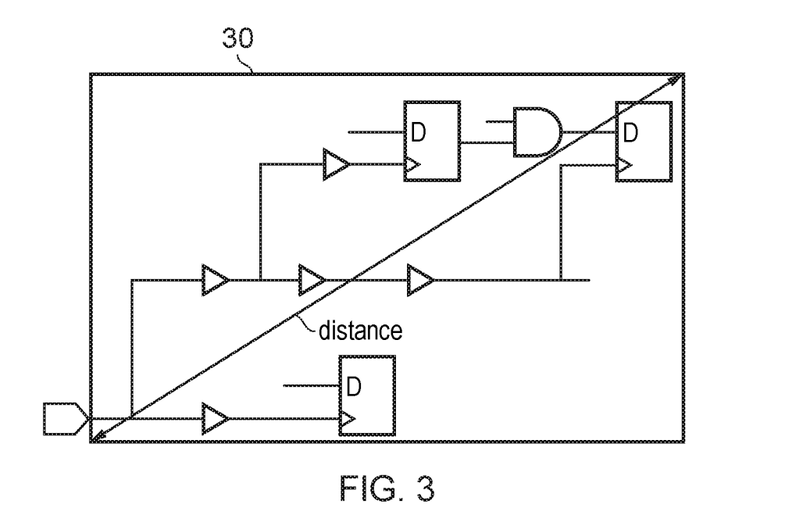
FIG. 3 schematically illustrates determining a distance between a target cell and a reference point of the circuit.

The timing derate from the AOCV table 4 may also depend on a physical distance between a given logic cell and the reference point to the circuit. In general the reference point may be a part of the circuit where signal paths split so that downstream cells may skew in timing so that the relative time between the different branches needs to be checked at points where the recombine (for example in the example of FIG. 2 the clock signal and data signal arriving at flip-flop 14 may need to satisfy certain timing requirements). As cells are located further apart, the variation in the propagation through cells tends to increase. Therefore, the AOCV table 4 may provide a timing derate with increased variation if the distance of a certain cell from a reference point is larger. As shown in FIG. 3, the distance may for example be determined by constructing a bounding box 30 which surrounds the target cell and the reference point and then measuring the length of the diagonal between opposite corners of the bounding box 30.

Figure 4:
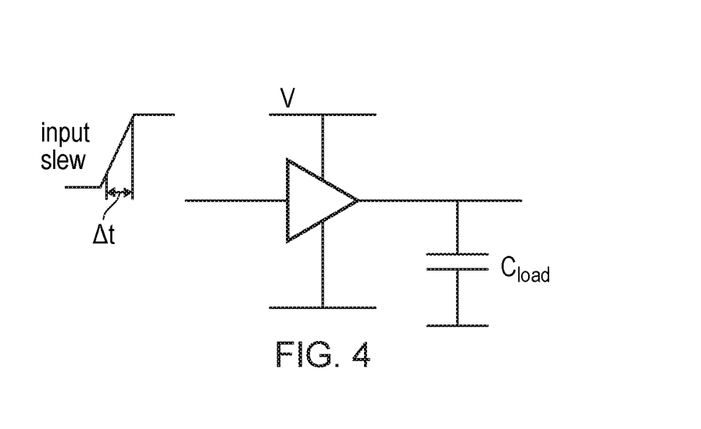
FIG. 4 illustrates different design parameters which may affect variation in propagation delay through a logic cell.

Hence, the AOCV table for may be indexed by the cell depth or the distance to select a timing derate for a given cell. In particular, the present technique can be particular useful for stage-based OCV tables which are indexed by logic depth. However, the AOCV table is typically determined based on simulation of a standard cell at a single design condition surrounding the target cell, regardless of the actual condition surrounding the target cell in the particular integrated circuit design. In practice, the same cell located in different places in the design may experience different design conditions depending on the surrounding circuitry. For example, FIG. 4 shows examples of various design parameters which may affect the delay variation. For example, the parameters may include an input slew rate of an input signal to the cell (how fast the input signal rises or falls), which may for example be characterised by a length of time required for the signal to change from a first reference value to a second reference value. Also, the design parameters may include variations in the voltage level applied to the cell, such as a supply voltage. For example, the voltage variation may be caused by IR drop. Also, the capacitive load coupled to the cell may affect the cell's propagation delay, since a large load may cause a slower transition of signals driven by the cell. Hence, the slew parameter ΔT, the voltage V, and the load $C_{load}$ may all affect the design conditions of the cell, and may be different from corresponding conditions assumed when determining the AOCV table 4. This means that the timing derate determined with the AOCV table may in fact indicate a greater or smaller variation of the delay through the cell than is actually experienced by the cell when in operation. This can be a problem since optimism may cause the STA tool to pass the integrated circuit design when it would actually fail in practice, and pessimism may result in false positive timing violations being detected which may lead to additional buffers 22 being inserted into data or clock paths to correct the timing violations, which will increase the circuit area and power consumption of the circuit when it is manufactured.

Therefore, the timing derate from the AOCV table 4 can be adjusted based on the expected design conditions of each cell. Referring again to FIG. 1, data 40 defining the expected design condition for each cell is input to the STA tool. For example, this data can be derived from a simulation of the integrated circuit design (performed using SPICE or another simulation tool for example), or the tester may input certain design conditions which they wish to test for. The data 40 may define one or more parameters (e.g. slew, load, voltage) which represent the design condition for each cell. In some cases the expected design conditions may be read by the STA tool from a recording medium or received via a communication connection such as a network link.

Based on the expected design condition for a given cell, a derate adjustment factor 42 for that cell is determined. For example, the STA tool may maintain a data structure which stores a number of different derate adjustment values for different expected design conditions, or the mapping of design conditions to corresponding derate adjustments may be coded into the software of the STA tool. If the expected design condition is not one of the design conditions for which derate adjustment values are represented in the data structure, the derate adjustment factor may be determined by interpolation between derate adjustment factors stored for nearby design conditions in the data structure. Having selected a derate adjustment for a given target cell, the timing derate from the AOCV table 4 is adjusted using the derate adjustment factor at step 44 to give an adjusted derate representing the expected variation in delay through the cell at the expected condition. In a similar way, adjusted derates can be determined for each target cell in the design. The adjusted derates are then used by the STA tool 46 to estimate the expected timing through signal paths of the circuit design. At step 48, the STA tool determines whether there were any timing violations. For example, a setup time violation may be detected if a data signal arrives at a logic cell too late relative to the clock signal and so misses the time when it should advance to the next stage. If a setup time violation is detected, then the circuit design can be modified to correct this, for example by exerting extra buffers in the clock path to slow the clock signal. On the other hand, a hold time violation may be detected if an input signal on a data path changes too soon after the clock's active transition. Hold time violations may be corrected by adding an extra buffer to the data path. Having modified the circuit design to try to eliminate the detected timing violations, the STA process can be repeated to check whether the modified circuit meets the timing requirements. If there are no timing violations, then at step 50 a pass report is issued to indicate that circuit design is expected to be functional and meet its timing requirements.

Hence, by adjusting the timing derate based on the expected design conditions of the cell, false positive or false negative detections of timing violations can be reduced to increase the likelihood that a pass report 50 issued by the STA tool will correctly reflect that the circuit will function correctly, and reduce the need for additional timing margins to ensure correct functionality which would incur additional circuit overheads in inserting additional buffers into the signal paths.

In some examples, the method of FIG. 1 can be modified to include an additional step of determining whether the expected design condition determined at step 40 is outside a predetermined set of one or more design conditions. If the expected design condition is outside the predetermined set of design conditions, then steps 42 and 44 are performed to determine the derate adjustment and adjust the timing derate read from the AOCV table 4, as described above. However, if the expected design condition is within the predetermined set of design conditions, then steps 42 and 44 can be omitted, and instead the timing derate read from the AOCV table 4 can be used directly for the static timing analysis step 46, without adjustment.

Figure 5:
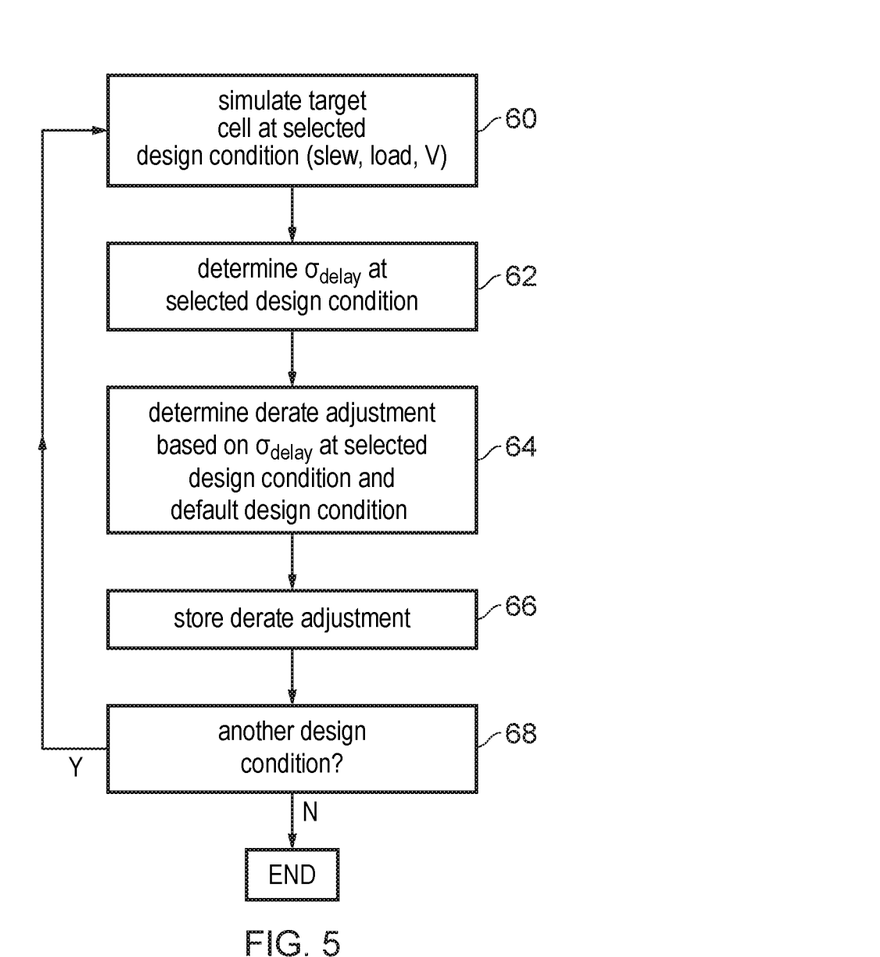
FIG. 5 illustrates a method of determining a derate adjustment.

FIG. 5 shows one example method of determining the derate adjustments to be applied in the STA method of FIG. 1. At step 60 the target cell is simulated at a selected design condition, for example a given selection of slew, load or voltage values. At step 62, the variance of the propagation delay through the cell is determined for the selected design condition. At step 64, the derate adjustment for that design condition is determined based on the variance of the delay at the selected design condition and the variance of the delay at a default design condition which was used to calculate the AOCV table 4. For example, in general the Derate for a clock path may be calculated according to the formula:

$$1 \pm \frac{n * \sigma_{delay}}{\mu_{delay}},$$

where n=number of sigmas where $\sigma_{delay}$ and $\mu_{delay}$ are the standard deviation and mean value of the propagation delay, and n is a specified number of standard deviations selected by the STA tester. In general, by increasing the number of standard deviations n, a greater confidence that the circuit will meet its timing requirements can be achieved. However, this may be at the expense of adding extra buffers into the timing paths to deal with the cases where the delay departs from the mean by a larger number of standard deviations. In practice, the tester may select a value which ensures a sufficiently high percentage of the circuits will meet their timing requirements. For example, with n=2, 95% of cells will be within 2 standard deviations of the mean delay, while with n=3, 99.7% of cells will be within 3 standard deviations of the mean delay. Generally, the number of standard deviations may be determined based on how many parts per million it is acceptable to sacrifice in yield during manufacturing. The number of standard deviations may be different for setup violations compared to hold violations, since hold violations may be more significant in terms of failure of the overall circuit design.

The derate adjustment for a selected design condition may be calculated according to the following equation:

$$\text{Adjusted Derate} = \frac{1 \pm \frac{n * \sigma_{index1\_index2\_delay}}{\mu_{index1\_index2\_delay}}}{1 \pm \frac{n * \sigma_{aocv\_index\_delay}}{\mu_{aocv\_index\_delay}}}$$

where $\sigma_{index1\_index2\_delay}$ and $\mu_{index1\_index2\_delay}$ are the standard deviation and mean value of the propagation delay for design parameter indices representing the selected design condition (e.g. index 1 may represent slew and index 2 may represent load), $\sigma_{aocv\_index\_delay}$ and $\mu_{aocv\_index\_delay}$ are the standard deviation and mean value of the propagation delay for design parameter indices representing the design condition for which the AOCV table was determined, and n is a specified number of standard deviations selected for testing. The standard deviation divided by the mean represents the variance of the delay for a given design condition. The derate adjustment factor is then stored at step 66, for example writing it to a recording medium or storing it to a table or other data structure. At step 68 it is determined whether there is another design condition which should be tested, and if so then the method returns to step 60 for the other design condition, in which one or more of the design parameters are varied compared to the last design condition.

In this way, a derate adjustment can be determined for a number of different design conditions, and the derate adjustment can be stored or coded into the STA tool software for use in the method of FIG. 1. As well as probing different design conditions, different derate adjustments could also be determined for different types of standard cells so that a cell-specific derate adjustment could be selected at step 42 of FIG. 1.

In another example, the derate adjustment may be determined in a different way. The derate adjustment may use tables of data inside the technology view files to determine an appropriate derate value for a given cell. The tables are not multiplicative derates like the values in the stage-based AOCV (SBOCV) tables. Instead, they are tables of the ratios of variance at each input transition time/output load index that are independent of path depth. Hence, the derate adjustment factor $\alpha$ can be defined as $V_F/V_i$, the ratio of the variance $V_F$ of the propagation delay at the expected design condition to the variance $V_i$ of the propagation delay at the default design condition. It can be useful to represent the derate adjustment factor in this way, because this means the derate adjustment factor is independent of logic depth, so that the same derate adjustment factor can be used across a range of logic depths without introducing additional optimism or pessimism. The derate adjustment factor $\alpha$ determined in this way can then be used to calculate the adjusted derate $D_F$ for the expected design condition according to $D_F=(1-\alpha)+\alpha D_i$ where $D_i$ is the timing derate read from the derate table, and $\alpha$ is the derate adjustment factor. The derivation of this equation is shown below:
1. Consider the equations:

$$V = \frac{\sigma}{\mu}, D = 1 \pm \frac{NV}{\sqrt{s}}$$

$$\sqrt{s}(D-1) = \pm NV$$

Where:
V=variance.
$\sigma$=sigma, the standard deviation.
$\mu$=mean cell delay.
D=multiplicative derate.
N=sigma multiplier.
s=path depth.
2. Define alpha as the ratio of the variance at a particular input transition time/output load index to the variance at the input transition time/output load index that is chosen to represent the cell in the SBOCV table:

$$V_F = \alpha V_i$$

Where:
$V_i$=initial variance that is used to create the SBOCV derate in the AOCV file.
$V_F$=final variance with input transition time/output load correction.
$\alpha$=coefficient of proportionality between $V_F$ and $V_i$.
3. Define the final derate in terms of alpha and the initial derate:

$$D_F = 1 \pm \frac{NV_F}{\sqrt{s}} =$$

$$1 \pm \frac{\alpha NV_i}{\sqrt{s}} = 1 + \frac{\alpha\sqrt{s}(D_i-1)}{\sqrt{s}} = 1 + \alpha(D_i - 1) = (1-\alpha) + \alpha D_i$$

Some timing analysis tools cannot solve this form of $D_F$, and so these tools can use the following equation for derate correction:

$$k = \frac{(1-\alpha) + \alpha D_g}{D_g}$$

$$D_F = kD_i$$

Where:
$D_g$ is the graph-based AOCV derate (a derate assuming worst case delays for all inputs to a given cell).
$D_i$ is a graph-based or path-based AOCV derate (the path-based AOCV derate may consider actual timing arcs for a given path).

Since k is calculated from a graph-based AOCV number, it depends on path depth. The $D_i$ path depth depends on whether graph-based timing or path-based timing analysis is used. For graph-based timing analysis, $D_i$ has the same path depth as Dg. For path-based timing analysis, $D_i$ has a smaller path depth than $D_g$. The final derate value might be pessimistic, but it is never optimistic.

Note that $\alpha$ is not dependent on the path depth. This independence makes timing modification faster. The timing tool determines the input transition time and output load of each cell instance. It finds the appropriate alpha table for the instance. The utility interpolates to calculate the alpha value, and applies that alpha value to modify the cell delay for the instance.

Figure 6:
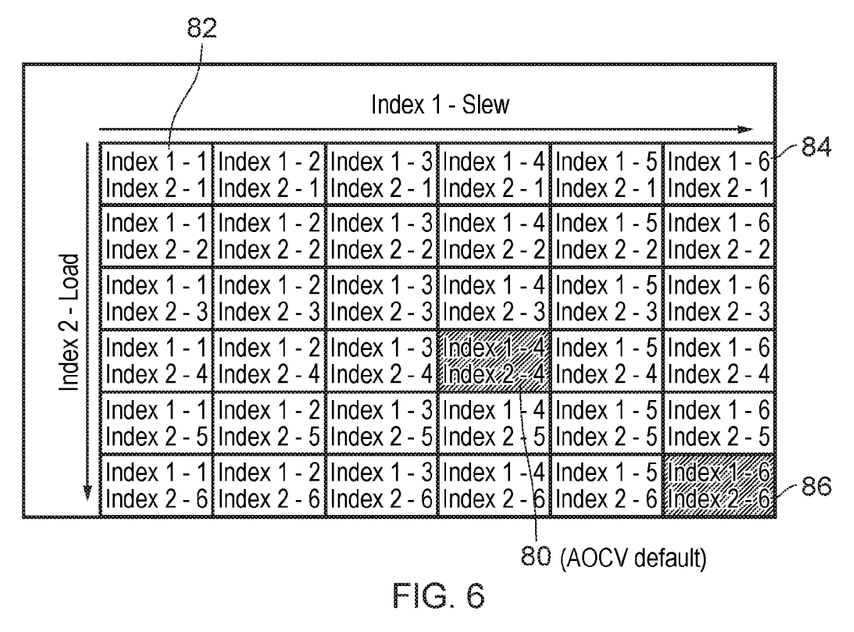
FIG. 6 schematically illustrates how different derate adjustments can be selected for different design conditions.
Figure 7:
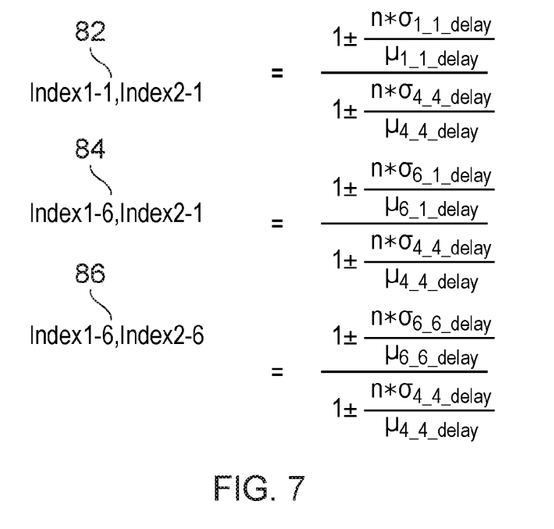
FIG. 7 shows examples of equations for determining the derate adjustment for different design conditions.

As shown in FIG. 6, having identified the derate adjustments for each design condition, a particular derate adjustment may be selected for a given set of design parameters. For example, FIG. 6 shows a case where the derate adjustments are predetermined for slew and load and then the slew and load values for a given cell are used to index into the table to select a particular derate adjustment to be applied. As shown in FIG. 7, each set of indices may correspond to a different adjustment factor. For example, in the example of FIGS. 6 and 7 it is assumed that the AOCV table 4 was determined for a point 80 where the slew has value identified by index 1-4 and the load has a value identified by index 2-4. FIG. 7 shows how to calculate the adjustment factors for 3 different design conditions 82, 84, 86, where the adjustment factor represents the amount by which the timing derate for the default AOCV position 80 should be multiplied to produce the timing derate for the other design conditions 82,

84, 86. Hence, each position will end up with a different derate based on its load and slew relation to the original load and slew used for the AOCV table. Depending on the position within the table relative to the AOCV slew load point, the derate adjustment factor may be larger or smaller than 1, so as to increase or decrease the amount of variation. This reflects whether or not the conditions were more or less favourable than the AOCV default condition. Interpolation can be used to interpolate between the adjustment factors represented in the table of derate adjustments, to account for design conditions other than those represented by the index points.

The calculated derate corrections may then be included in a script (e.g. a tcl (tool command language) script) that uses standard STA tool settings to find the cells within each slew/load range and apply the additional derate to either make them faster or slower based on the their position in the table. This removes any pessimism or optimism on the timing path that was introduced by using an AOCV table 4 for generated for only one point.

Figure 8:
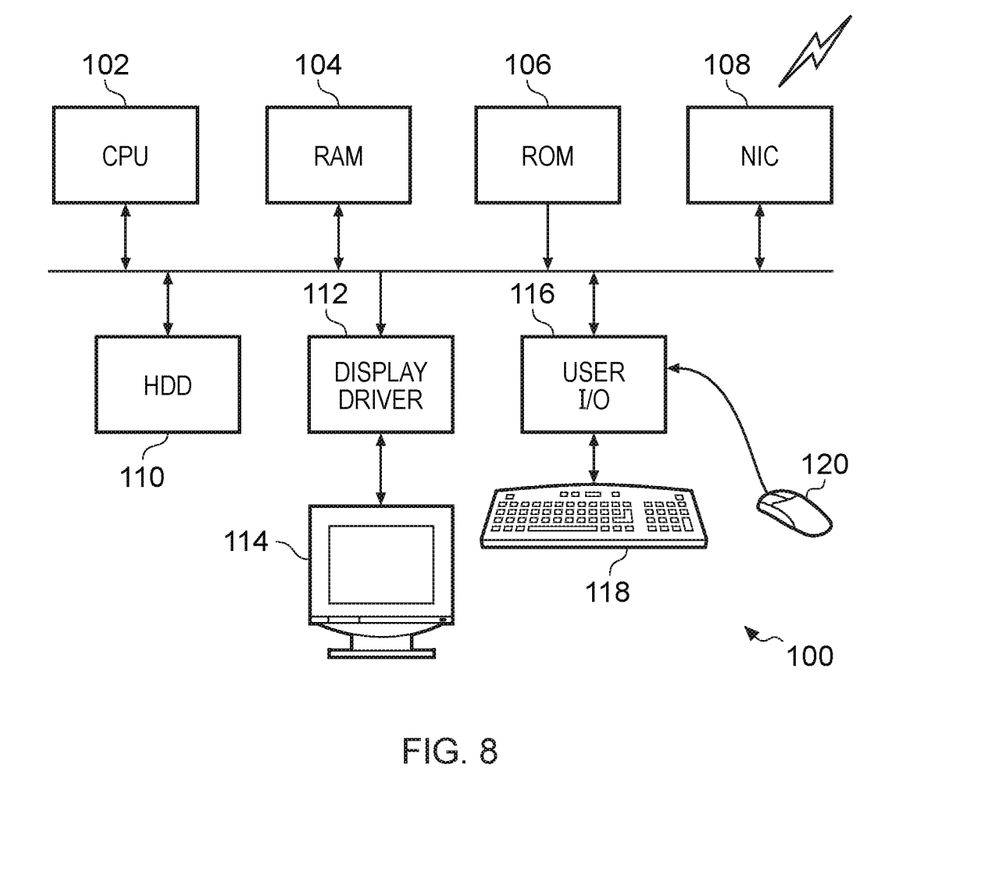
FIG. 8 illustrates a computer apparatus for performing the methods of static timing analysis or derate adjustment determination.

FIG. 8 illustrates an example of a computer apparatus 100 which may be used for implementing the methods described above. The computer apparatus may be a general purpose computer including a central processing unit 102, a random access memory 104, a read only memory 106, a network interface card 108, a hard disk drive 110, a display driver 112 and monitor 114 and a user input/output circuit 116 with a keyboard 118 and mouse 120 all connected via a common bus 122. In operation the central processing unit 102 will execute computer program instructions that may be stored in one or more of the random access memory 104, the read only memory 106 and the hard disk drive 110 or dynamically downloaded via the network interface card 108. The results of the processing performed may be displayed to a user via the display driver 112 and the monitor 114. User inputs for controlling the operation of the general purpose computer 100 may be received via the user input output circuit 116 from the keyboard 118 or the mouse 120. It will be appreciated that the computer program could be written in a variety of different computer languages. The computer program may be stored and distributed on a recording medium or dynamically downloaded to the general purpose computer 100. When operating under control of an appropriate computer program, the general purpose computer 100 can perform the above described techniques and can be considered to form an apparatus for performing the above described technique. The architecture of the general purpose computer 100 could vary considerably and FIG. 8 is only one example. Alternatively, the above-described techniques may be implemented in a more distributed fashion, wherein the general purpose computer 100 illustrated in FIG. 8 may be expanded and/or replaced by an infrastructure comprising components implemented on separate physical devices, the separate physical devices sharing the processing required to carry out these techniques. Such separate physical devices may be physically proximate to one another, or may even be located at entirely different physical locations. In some configurations such an infrastructure is termed a 'cloud computing' arrangement. A software tool executed by the computer 100 may be used to analyse the timing and the design. For example, a commercially available or in-house STA tool may be used.

In summary, a utility is provided that can be used during timing signoff along with SBOCV derate tables. It increases confidence in the timing result by adjusting delays to account for increased variation that is caused by input transition times and output loads beyond those modeled by SBOCV. It can be used to gain confidence particularly in hold timing signoff. Removing potential optimism due to input transition time and output load variation in the hold timing is more critical than setup timing, as hold timing is more critical because it affects the functional yield of every product that is manufactured, while setup timing affects only the frequency yield of the slowest parts manufactured. Nevertheless, it could also be used for setup timing if desired. The SBOCV files are provided for each PVT corner and contain tables of derate values for each cell, which are indexed by path depth. SBOCV tables exist for early and late arrival of rising and falling output edges. The following equation determines the derate values: Derate=$1\pm(N\sigma/\mu)$, where $\sigma$=standard deviation, $\mu$=mean delay, and N is a multiplier that determines the confidence that the model covers the entire distribution of the variation. Static timing software uses SBOCV tables to modify the cell delay of each instance in the design. The software multiplies the cell delay by the appropriate SBOCV table derate entry. The SBOCV format has some shortcomings, as it does not provide a way to specify derates for different timing arcs through each cell, and so typically the most pessimistic timing arcs to represent the cell, and it does not provide a way to modify derates based on input transition times and output loads. However, delay variation can have a strong dependence on the input transition time and output load. Derate values in the SBOCV table can be chosen to allow at least 70% of the input transition time/output load space to be modelled (modelling coverage of less of the parameter space can risk hold timing escapes, while guaranteeing modelling coverage of more of the surface can lead to excess pessimism, over-design, and difficulty closing timing signoff). Other examples may model greater or smaller than 70% of the input transition time/output load space using the SBOCV table.

The present technique overcomes the SBOCV input transition time and output load limitation by accounting for the portion of the input transition time/output load parameter space that remains beyond the SBOCV derates in the SBOCV tables. Along with SBOCV tables, it uses technology view files that specify how derates for each cell are modified across the input transition time/output load surface. The tool accomplishes the following:

Identifies instances with input transition time and output load outside of the range of the initial SBOCV tables.

Applies a correction to derate values for the outlying instances.

Can filter timing results and identify instances with delays modified by SOA that are contributing to failing timing paths.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer-implemented static timing analysis method for determining an expected timing of a signal path of an integrated circuit design, the method comprising:

obtaining, by a computer, a circuit representation defining the integrated circuit design;

determining, by the computer, a timing derate for a target cell on the signal path, wherein the timing derate is read from a derate table, the timing derate representing variation in a propagation delay through the target cell for a default design condition surrounding the target cell;

determining, by the computer, an expected design condition surrounding the target cell in the integrated circuit design;

determining, by the computer, a derate adjustment factor based on the expected design condition of the target cell;

adjusting, by the computer, the timing derate read from the derate table using the derate adjustment factor to generate an adjusted timing derate;

determining, by the computer, the expected timing of the signal path based on the adjusted timing derate for the target cell; and updating, by the computer, the circuit representation to modify the integrated circuit design when a timing violation is detected.

2. The method according to claim 1, wherein the expected design condition and the default design condition are dependent on at least one of:

a capacitive load of the target cell;
a slew rate of an input signal for the target cell; and
variation in a voltage level applied to the target cell.

3. The method according to claim 1, wherein the derate table is indexed according to a relative position of the target cell within the integrated circuit design to select a timing derate corresponding to said relative position.

4. The method according to claim 1, wherein the derate table is indexed according to a logic depth between the target cell and a reference point of the integrated circuit to select a timing derate corresponding to said logic depth.

5. The method according to claim 4, wherein the derate adjustment factor is independent of said logic depth.

6. The method of claim 1, wherein the derate adjustment factor indicates a ratio of a variance of the propagation delay through the target cell at said expected design condition to a variance of the propagation delay through the target cell at said default design condition.

7. The method of claim 1, wherein the adjusted timing derate $D_F$ is determined according to:

$$D_F = (1-\alpha) + \alpha D_i$$

where $D_i$ is the timing derate read from the derate table, and $\alpha$ is the derate adjustment factor.

8. The method of claim 1, wherein the adjusted timing derate $D_F$ is determined according to $D_F = kD_i$, where $D_i$ is the timing derate read from the derate table, $$k = \frac{(1-\alpha) + \alpha D_g}{D_g},$$

$\alpha$ is the derate adjustment factor, and $D_g$ is a graph-based timing derate for the target cell.

9. The method according to claim 1, wherein said expected design condition is determined based on simulation of the integrated circuit design.

10. The method according to claim 1, wherein said expected design condition is input by a user.

11. The method according to claim 1, wherein the derate adjustment factor is determined based on a data structure storing derate adjustments for a plurality of expected design conditions.

12. The method according to claim 11, wherein when the expected design condition is different to one of said plurality of expected design conditions, the derate adjustment factor is determined by interpolation from one or more derate adjustment factors stored in said data structure.

13. The method according to claim 1, wherein for at least one expected design condition other than said default design condition, the adjusted timing derate equals the timing derate read from the derate table.

14. The method according to claim 1, comprising determining whether the expected design condition is outside a predetermined set of design conditions, wherein the timing derate is adjusted using the derate adjustment factor to generate the adjusted timing derate when the expected design condition is outside the predetermined set of design conditions.

15. The method according to claim 1, wherein the derate adjustment factor is determined based on a cell type of the target cell.

16. The method according to claim 1, comprising detecting whether one or more timing violations occur in the integrated circuit design based on the expected timing of the signal path determined based on the adjusted timing derate.

17. The method of claim 16, comprising updating a data representation of the integrated circuit design to modify the integrated circuit design when a timing violation is detected.

18. A computer apparatus configured to perform static timing analysis for determining an expected timing of a signal path of an integrated circuit design;

the computer apparatus comprising processing circuitry configured to:

obtain a circuit representation defining the integrated circuit design;

determine a timing derate for a target cell on the signal path by reading the timing derate from a derate table, the timing derate representing variation in a propagation delay through the target cell for a default design condition surrounding the target cell;

determine an expected design condition surrounding the target cell in the integrated circuit design;

determine a derate adjustment factor based on the expected design condition of the target cell;

adjust the timing derate using the derate adjustment factor to generate an adjusted timing derate;

determine the expected timing of the signal path based on the adjusted timing derate for the target cell; and update the circuit representation to modify the integrated circuit design when a timing violation is detected.

19. A computer apparatus for performing static timing analysis for determining an expected timing of a signal path of an integrated circuit design;

the apparatus comprising processing means for:

obtaining a circuit representation defining the integrated circuit design;

determining a timing derate for a target cell on the signal path by reading the timing derate from a derate table, the timing derate representing variation in a propagation delay through the target cell for a default design condition surrounding the target cell;

determining an expected design condition surrounding the target cell in the integrated circuit design;

determining a derate adjustment factor based on the expected design condition of the target cell;

adjusting the timing derate using the derate adjustment factor to generate an adjusted timing derate;

determining the expected timing of the signal path based on the adjusted timing derate for the target cell; and updating the circuit representation to modify the integrated circuit design when a timing violation is detected.

\* \* \* \* \*